United States Patent Office 2,785,822
Patented Mar. 19, 1957

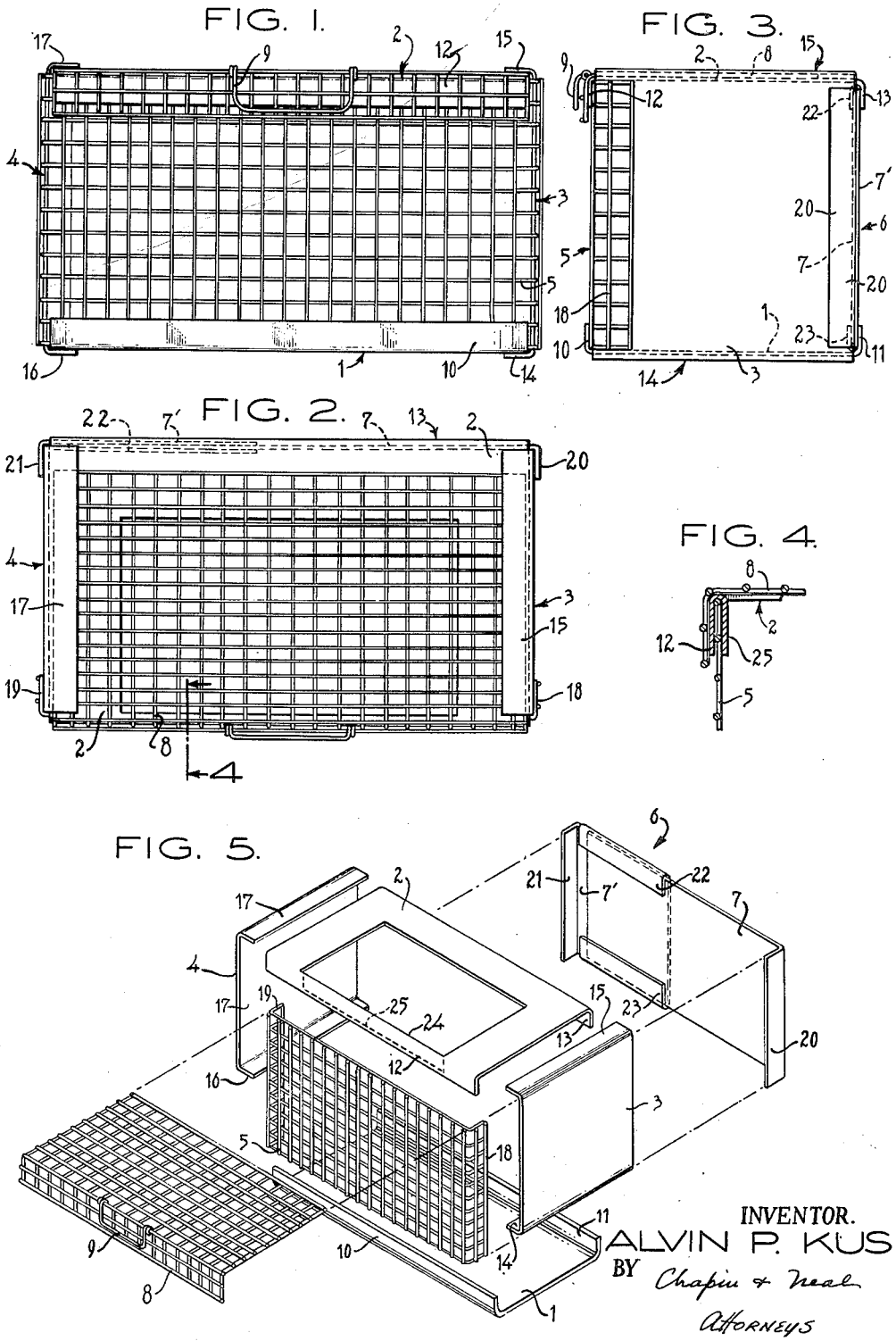

2,785,822

COLLAPSIBLE ANIMAL CAGE

Alvin P. Kus, Somers, Conn.

Application July 13, 1954, Serial No. 443,067

2 Claims. (Cl. 220—4)

This invention relates to improvements in collapsible animal cages, particularly cages for the housing of small rodents, such as hamsters, rats, mice and the like.

An object of the present invention is to provde a collapsible cage, which is light in weight, sturdy and easy to assemble and disassemble and which in disassembled form is capable of shipment as a relatively small flat package.

A further object of the present invention is to provide an animal cage which is open to light or the vision of a viewer.

Another object of the present invention is to provide an animal cage which is sanitary and easy to clean.

With the above and other objects in view, the present invention will be hereinafter more particularly described, and the parts will be shown in the accompanying drawing and pointed out in the claims which form part of this specification.

Reference will now be had to the drawing, wherein like numerals of reference designate corresponding parts throughout the several views, in which:

Fig. 1 is a front elevation of an assembled cage;

Fig. 2 is a top plan of the cage of Fig. 1;

Fig. 3 is a side elevation of the same;

Fig. 4 is a fragmentary sectional view on line 4—4 of Fig. 2; and

Fig. 5 is an exploded view showing the various separable parts of the cage in perspective.

The separable wall members of the present invention can be best seen individually in Fig. 5 wherein, wall members 1 and 2 (bottom and top), 3 and 4 (opposite ends), and 5 and 6 (front and back) are formed as three sets of mating walls with facing marginal flanges at corresponding ends of each set of members. Wall member 6 comprises two panel sections 7 and 7' each providing at its outer end the marginal flange for said wall member, said panels at their inner edges being adapted to slidably overlap each other in interengaged relation so as to form the wall 6 mating with front wall member 5. One of the panels as 7' may be formed with reversely bent extensions as at 22 and 23 to provide flange tracks along its top and bottom edges to receive the edges of the other panel for the interengaging slidable relation.

In Fig. 1, the facing marginal flanges 10 and 12 of wall members 1 and 2, respectively, can be seen lying outwardly of the free edges of the adjacent front wall member 5. In Fig. 3 the facing flanges 11 and 13 at the rear side of walls 1 and 2 are also seen lynig outwardly of the adjacent free edges of the rear wall member 6. The facing marginal flanges 14 and 15 of wall member 3 and flanges 16 and 17 of wall member 4, may also be seen lying outwardly of the free edges of their adjacent bottom and top wall members 1 and 2, respectively (see Figs. 1, 2 and 3).

In Fig. 3 the facing marginal flanges 18 and 20 at corresponding ends of opposing front and rear wall members 5 and 6, respectively, can be seen lying outwardly of the free edges of wall member 3 and in Fig. 2 the similar flanges 19 and 21 of walls 5 and 6 are shown to be outwardly of the free edges of the opposite side or end wall 4.

Thus each pair of facing walls has the marginal flanges thereof outwardly overlapping the free edges of the adjacent pair of walls and provides a self-sustaining cage unit when in assembled form. The cage as shown by Figs. 1 and 3 can easily be collapsed by withdrawing the panel elements 7 and 7' from the unit whereupon the remainder of the walls will become disengaged.

As clearly shown by the drawings the front wall 5 is preferably of wire mesh screen material for observation of the caged animal and a top opening in top wall 2 with screen cover 8 is also provided as will be later described. Other walls of the cage may also be formed of screen if desired.

With reference to Fig. 5, the cage is assembled by placing the top and bottom walls, the two end walls and the front wall in assembled relation as described and manually holding the top and bottom walls in spaced position. As will be seen from Fig. 3 the flanges 13 and 11 of the top and bottom wall extend beyond the adjacent edge of the end wall 3 and at the opposite end will extend beyond the end wall 4. It will be noted from the showing of rear wall 6 (Fig. 5) that the panel elements 7 and 7' may be separated from each other by sliding the panel 7 outwardly of the flange tracks 22 and 23 of panel 7'. As the flanges 13 and 11 are held manually in their assembled spaced relation, rear wall 6 is inserted in place by sliding panels 7 and 7' inwardly from each opposite end of the cage, first tucking the free edges under the flanges 11 and 13. The panel 7 is, in the act of assembling the rear wall, re-inserted in the flange tracks 22 and 23 of panel 7'. As shown the inner end portions of panels 7 and 7' overlap each other preferably to a substantial degree to form the mating wall member opposite the front wall screen member 5. With the flanges 20 and 21 hugging the free edges of end walls 3 and 4 the walls are interlocked for a self-supporting cage unit. The two-piece wall 6 is maintained with the panels 7 and 7' in planar relation by the substantial overlap of the contacting portions thereof.

One of the walls may also provide an access opening to the cage as the opening 24 in the top wall 2. A door or screen cover for the opening is shown by the sliding panel or cover 8 of wire screening. A handle 9 is shown fixed to the slidable panel at its front flanged edge for convenience in manipulating the same into sliding engagement at its marginal edges under the flanges 17 and 15 of the walls 3 and 4. The screen 8 can thus be held in flat contact against the top 2 overlying the opening 24. It is also to be noted that the front edge of the opening 24 is adjacent the marginal flange 12 (see Fig. 4) and that an extension is formed at 25 to be downwardly turned as a pocket in which to receive the upper free edge of front wall 5.

What is claimed is:

1. A collapsible six sided animal cage having the walls of the facing sides thereof formed with two opposite side edges having inwardly directed marginal flanges with the other opposite sides of the walls having free edges, each pair of facing walls having the marginal flanges thereof outwardly overlapping the free edges of an adjacent pair of walls, one of said sides comprising separable panel members with the panels having the said marginal flanges at their outer ends, the adjacent free end portions of said panels in assembled position being provided with substantial overlapping portions and having interengaging means for relative slidable movement, another of said sides being formed of wire mesh screen, and still another of said side walls having an access opening in the body thereof and a sildable panel lying in flat relation against said side wall outwardly thereof and covering said opening with a pair of opposite marginal side edges of said sildable panel being releasably engaged under the overlapping marginal flanges of the adjacent side wall members.

2. The structure of claim 1 in which one of said separable panels is formed with its opposed free edges reversely folded to receive in the slotted tracks thereof the free edges of the other panel, said side wall having the access opening constitutes the top wall of the cage and said wire mesh screen wall forms the front wall thereof with its flanged edges arranged to engage the adjacent free edges of opposite end walls and one edge of said access opening lies in closely spaced facing relation to the front marginal flange of the top wall for embracing in the slotted pocket formed thereby the adjacent upper free edge of said front screen wall.

References Cited in the file of this patent

UNITED STATES PATENTS

| | | |
|---|---|---|
| 494,215 | Meem | Mar. 28, 1893 |
| 563,506 | McGraw | July 7, 1896 |
| 786,858 | Thomas | Apr. 11, 1905 |
| 1,182,158 | Fenner | May 9, 1916 |
| 2,667,398 | Claflin | Jan. 26, 1954 |

FOREIGN PATENTS

| | | |
|---|---|---|
| 139,883 | Great Britain | Mar. 18, 1920 |
| 650,163 | France | Sept. 17, 1928 |